(12) United States Patent
Mixon et al.

(10) Patent No.: US 9,528,854 B1
(45) Date of Patent: Dec. 27, 2016

(54) DETERMINING DOWNSTREAM LOAD IN A DISTRIBUTION NETWORK

(71) Applicant: Southern Company Services, Inc., Atlanta, GA (US)

(72) Inventors: Grayson Thomas Mixon, Pensacola, FL (US); Jack Charles Hierholzer, Pensacola, FL (US)

(73) Assignee: Southern Company Services, Inc., Atlanta, GA (US)

( * ) Notice: Subject to any disclaimer, the term of this patent is extended or adjusted under 35 U.S.C. 154(b) by 215 days.

(21) Appl. No.: 14/322,052

(22) Filed: Jul. 2, 2014

Related U.S. Application Data

(60) Provisional application No. 61/944,630, filed on Feb. 26, 2014.

(51) Int. Cl.
 *G01D 4/00* (2006.01)
(52) U.S. Cl.
 CPC .................................... *G01D 4/002* (2013.01)

(58) Field of Classification Search
 USPC .......................................................... 340/30
 See application file for complete search history.

(56) References Cited

U.S. PATENT DOCUMENTS

2010/0286840 A1* 11/2010 Powell ................... G01D 4/002
 700/295
2015/0042488 A1* 2/2015 Bell ....................... G08C 19/02
 340/870.02

\* cited by examiner

*Primary Examiner* — Kabir A Timory
(74) *Attorney, Agent, or Firm* — Thomas | Horstemeyer, LLP

(57) ABSTRACT

Disclosed are various embodiments for calculating a downstream load in a power distribution network. A power distribution network may comprise smart meters capable of communicating readings describing power consumed by a customer to a monitoring computing device. A downstream load may be determined by the monitoring computing device for a point in the power distribution network using an average power determined for devices downstream from the point in the power distribution network. The average power for the devices downstream may be determined utilizing the readings received from the smart meters.

20 Claims, 6 Drawing Sheets

DETERMINING DOWNSTREAM LOAD IN A DISTRIBUTION NETWORK

CROSS-REFERENCE TO RELATED APPLICATIONS

This application claims the benefit of and priority to U.S. Provisional Patent Application No. 61/944,630, filed on Feb. 26, 2014, and entitled "DETERMINING DOWNSTREAM LOAD IN A DISTRIBUTION NETWORK," the entire contents of which is hereby incorporated by reference in its entirety herein.

BACKGROUND

Existing solutions for calculating a downstream load in a distribution network utilize a load at a substation, electrical properties of the various wire sizes used in the distribution network, generalized assumptions made about transformer loading, and an estimated line loss in the network. However, because these solutions do not use individual customer data, they rely on general assumptions about transformer loading. For example, transformer loading may be generalized at an 80% loading capacity to account for downstream customers fed from the transformer. The assumptions made in calculating a downstream load only provide an educated guess and do not provide an accurate understanding of current system loading.

A smart meter, such as an advanced metering infrastructure (AMI) meter, is an electronic device capable of measuring residential and commercial consumption of electric use for one or more buildings. AMI meters may be capable of one-way or two-way communication, whereby the measured residential or commercial consumption may be transmitted to a utility company for billing purposes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
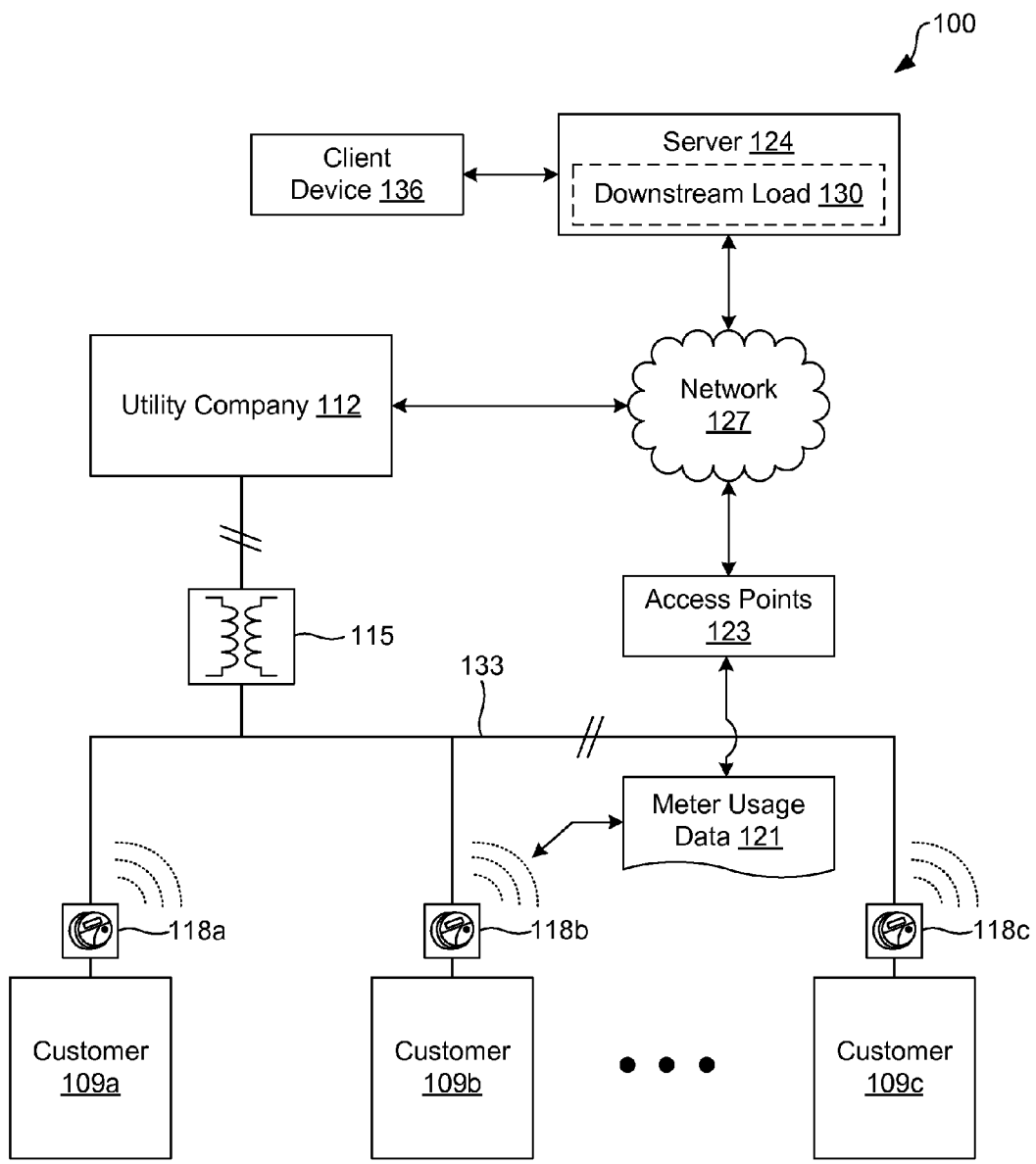
FIG. 1 is a drawing of a power distribution network according to various embodiments of the present disclosure.

The present disclosure relates to calculating a downstream load for one or more devices and/or locations in a distribution network. Traditionally, utility companies, such as telecommunication and power companies, have a computer model reflecting infrastructure that exists at various locations of a telecommunication or electrical grid. For example, the computer model may resemble the location and capabilities of transformers, conduit, electrical cables, etc., in the field. This computer model is traditionally made available in a geographic information system (GIS) for use in calculating an amount of electricity that flows through a piece of equipment (referred to as a "load calculation"), determining which devices in the field that may be used to open or close to re-route power (referred to as "switching"), and aggregating information coming from customers who report that they have a power outage to predict what device has caused the power outage (referred to as "outage management").

Conventionally, customers are associated with or otherwise "linked" to a transformer in the computer model so that it is known which transformer a customer is connected to in the field. This customer association may be stored in various systems such as, for example, a customer information system (CIS). Connecting a new customer to an electrical grid requires personnel to manually enter a meter number and a transformer identifier into a computer for use by the CIS. As may be appreciated, the transformer identifier may correspond to the transformer in the field that provides power to the new customer.

Traditionally, calculating a downstream load in a distribution network utilizes a load at a substation, electrical properties of the various wire sizes used in the distribution network, generalized assumptions made about transformer loading, and an estimated line loss in the network. Similarly, calculating an estimated peak in power consumption employs "diversity factors" to account for all customers not reaching a peak at the same time. However, because these solutions do not use individual customer data, they rely on general assumptions and do not accurately represent a current state of consumption in the field. For example, transformer loading may be generalized at an 80% loading capacity to account for downstream customers fed from the transformer while, in reality, the transformer may have a loading capacity substantially different than 80%. The assumptions made in calculating a downstream load only provide an educated guess and do not provide an accurate understanding of current system loading.

With the emergence of smart meters, customers in a network may have an AMI meter or a similar smart meter. The usage reported by the meter is an amount of energy consumed by a customer since the meter was reset. According to various embodiments, an AMI meter communicates over a wireless fidelity (Wi-Fi) or a radiofrequency (RF) network.

It is beneficial to utilize data obtained for AMI meters in a distribution network to calculate a downstream load accurately representing a current state of the distribution network as a whole or, more specifically, the current state of a location in the distribution network. According to various embodiments, an average power may be calculated using the periodic readings obtained from the AMI meter for a respective customer. Given an average power of each customer in a portion of a distribution network, the average power reading obtained from each customer may be aggregated to calculate the downstream load in kilowatts (KW) at any point on the distribution network. Similarly, the downstream load may be employed to detect theft. By adding up the load of the AMI meters downstream from a device, it is possible to compare the billable power from AMI to the actual power consumed. The difference between the two is a power loss that may be a result of theft.

With respect to FIG. 1, shown is a non-limiting example of a power distribution network 100 employed in calculating a downstream load 130 for one or more customers, devices, and/or locations in the power distribution network 100. The power distribution network 100 may comprise a networked environment such as a cellular network, a wide area network (WAN), a local area network (LAN), the Internet, or any similar network.

As may be appreciated, the power distribution network 100 comprises one or more customers 109a . . . 109c (collectively customers 109) that receive a product or service from a utility company 112. For example, one or more of the customers 109 may receive power from a transformer 115 maintained by the utility company 112 via an electrical line connected to a residence of the customer 109. Smart meters 118a . . . 118c (collectively smart meters 118) are capable of reading a usage of the power obtained from the utility company 112 at each location of the customers 109.

According to various embodiments, the smart meters 118 may comprise AMI meters, Automatic Meter Reading (AMR) meters, any other similar smart meters 118, and a combination thereof. As may be appreciated, the smart meters 118 may be configured to communicate the power consumed by each customer 109 as meter usage data 121 to one or more access points 123. To this end, the access points 123 comprise a wired access point (e.g., a network switch) or a wireless access point (e.g., a wireless router, radio frequency (RF) receiver) capable of receiving the meter usage data 121 from one or more smart meters 118 and communicating the meter usage data 121 to a server 124 over a network 127.

Generally, the meter usage data 121 may comprise the power consumed by each customer 109 as well as meter identification data that may be used to authenticate and identify one or more smart meters 118. Further, the meter usage data 121 may comprise the power consumed by each customer 109 at predefined and/or random time intervals. To this end, the meter usage data 121 may comprise a power reading associated with a timestamp, as will be discussed in greater detail below.

According to various embodiments, the frequency of the readings transmitted from the smart meters 118 as meter usage data 121 can be predefined and/or configured by a system administrator, for example, via server 124, or a technician in the field. Accordingly, the readings from the smart meters 118 may be configured to be transmitted, for example, daily, hourly, or every fifteen minutes. A non-limiting example of meter usage data 121 produced by one of the smart meters 118 is shown below in Table 1.

TABLE 1

Example Meter Usage Data from a Smart Meter

| Reading Timestamp | Reading Value (WKH) |
| --- | --- |
| Feb. 18, 2014 22:00 | 29203 |
| Feb. 18, 2014 23:00 | 29206 |
| Feb. 19, 2014 0:00 | 29210 |
| Feb. 19, 2014 1:00 | 29214 |
| Feb. 19, 2014 2:00 | 29215 |
| Feb. 19, 2014 3:00 | 29216 |
| Feb. 19, 2014 4:00 | 29216 |

TABLE 1-continued

Example Meter Usage Data from a Smart Meter

| Reading Timestamp | Reading Value (WKH) |
| --- | --- |
| Feb. 19, 2014 5:00 | 29217 |
| Feb. 19, 2014 6:00 | 29218 |
| Feb. 19, 2014 7:00 | 29219 |
| Feb. 19, 2014 8:00 | 29220 |
| Feb. 19, 2014 9:00 | 29221 |
| Feb. 19, 2014 10:00 | 29222 |

Using the meter usage data 121, as well as known characteristics of particular infrastructure in the network 100, the server 124 may execute a monitoring application capable of calculating a downstream load 130 for any point in the network 100 using at least the meter usage data 121 associated with that point. For example, for the transformer 115 having downstream customers 109a . . . 109c, the meter usage data 121 obtained from the customers 109a . . . 109c may be used to determine an instantaneous power for each customer 109, as will be described in greater detail below.

A summation of the instantaneous power determined for each customer 109a . . . 109c may reflect the downstream load 130 for the transformer 115. Further, the server 124 may compute the downstream load 130 while accounting for the known characteristics in the downstream infrastructure, such as line loss in a transmission line, a distribution line 133, etc. The server 124 may communicate the downstream load 130 to a client device 136 for rendering in a display, as will be discussed in greater detail below.

Figure 2:
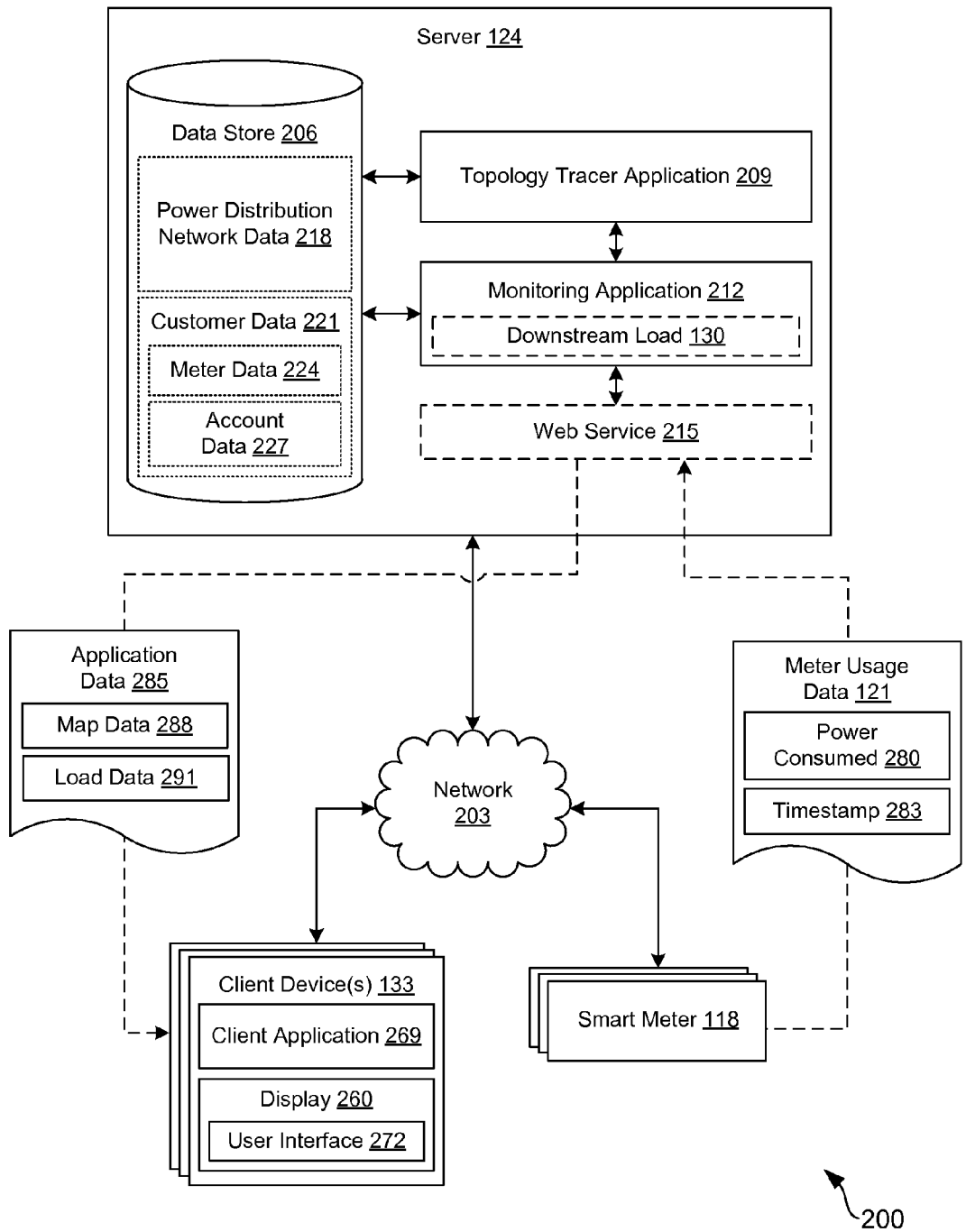
FIG. 2 is a drawing of a networked environment that may be employed in the power distribution network of FIG. 1 according to various embodiments of the present disclosure.

Moving on to FIG. 2, shown is a networked environment 200 according to various embodiments that may be implemented in to the power distribution network 100 of FIG. 1. The networked environment 200 includes a server 124, a client device 136, and a smart meter 118, which are in data communication with each other via a network 203. The network 203 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The server 124 may comprise, for example, a single server computer or any other system providing computing capability. Alternatively, the server 124 may employ a plurality of computing devices that may be arranged, for example, in one or more server banks or computer banks or other arrangements. Such computing devices may be located in a single installation or may be distributed among many different geographical locations. For example, the server 124 may include a plurality of computing devices that together may comprise a hosted computing resource, a grid computing resource and/or any other distributed computing arrangement. In some cases, the server 124 may correspond to an elastic computing resource where the allotted capacity of processing, network, storage, or other computing-related resources may vary over time.

Various applications and/or other functionality may be executed in the server 124 according to various embodiments. Also, various data is stored in a data store 206 that is accessible to the server 124. The data store 206 may be representative of a plurality of data stores 206 as can be appreciated. The data stored in the data store 206, for example, is associated with the operation of the various applications and/or functional entities described below.

The components executed on the server 124, for example, include a topology tracer application 209, a monitoring application 212, a web service 215, and other applications, services, processes, systems, engines, or functionality not discussed in detail herein. The topology tracer application 209 is executed to identify existing infrastructure downstream from a predefined location in a power distribution network 100. For example, given that the predefined location comprises a transformer 115 (FIG. 1), the topology tracer application 209 is executed to identify all downstream infrastructure (e.g., subsequent transformers, smart meters 118 at residences) and/or upstream infrastructure (e.g., power stations). By identifying the downstream infrastructure, a load may be determined for the transformer 115 using smart meters 118 fed by the transformer 115.

The monitoring application 212 is executed to receive a plurality of readings from the smart meters 118 as meter usage data 121 over the network 203. Further, the monitoring application 212 is executed to determine a downstream load 130 using, for example, an instantaneous and/or average power determined for each smart meter 118 located in the power distribution network 100.

The web service 215 is executed to provide a medium for communication between the server 124 and the client device 136 over the network 203. To this end, the web service 215 may comprise a network-based application programming interface (API) embodied in software that facilitates programmatic service calls (e.g., API calls) made by the client device 136 to communicate with the topology tracer application 209, the monitoring application 212, and/or other services or applications not described herein. According to various embodiments, the network-based API may further comprise a representational state transfer (REST) or a simple object access protocol (SOAP) API. Further, the web service 215 may enable communication between the topology tracer application 209 and the monitoring application 212.

The data stored in the data store 206 includes, for example, power distribution network data 218, customer data 221, and potentially other data. The power distribution network data 218 may comprise information associated with the topology of the power distribution network 100. To this end, a topology may comprise a computer model reflecting existing, previously existing, and/or planned utility infrastructure in a network as well as locations, addresses, identifiers, capabilities, and/or any other information associated with equipment in the power distribution network 100. The customer data 221 may comprise information associated with a customer 109, such as meter data 224 and account data 227. Meter data 224 may include a power usage history for the customer 109, an identifier for a smart meter 118 associated with the customer 109, etc. Account data 227 may comprise location and/or payment information associated with the customer 109 including, but not limited to, an address, an account number, a payment history, etc.

The client device 136 is representative of a plurality of client devices 136 that may be coupled to the network 203. The client device 136 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 136 may include a display 260. The display 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 136 may be configured to execute various applications such as a client application 269 and/or other applications. The client application 269 may be executed in the client device 136, for example, to access network content served up by the server 124 and/or other servers, thereby rendering a user interface 272 on the display 260. To this end, the client application 269 may comprise, for example, a browser, a dedicated application, etc., and the user interface 272 may comprise a network page, an application screen, etc. The client device 136 may be configured to execute applications beyond the client application 269 such as, for example, email applications, social networking applications, word processors, spreadsheets, and/or other applications.

Next, a general description of the operation of the various components of the networked environment 200 is provided. To begin, it is assumed a customer 109 (e.g., a business or a residence) receives power from a utility company 112 (FIG. 1) via a distribution line 133 (FIG. 1) connected to a residence of the customer 109. The smart meters 118 are configured to measure a usage of power obtained from the utility company 112 at each residence of the customers 109.

The smart meters 118 communicate readings as meter usage data 121 to the server 124 over the network 203 at, for example, predefined intervals or in response to a request from a requesting device (e.g., the server 124 or a handheld device employed by technicians in the field). As may be appreciated, the meter usage data 121 may comprise a power consumed 280 by the customer 109 as well as a timestamp 283 associated with the power consumed 280. In various embodiments, the meter usage data 121 may further comprise meter identification data that may be used to authenticate and identify one or more smart meters 118.

The monitoring application 212 uses the meter usage data 121 to determine a downstream load 130 for a location or device in the power distribution network 100. The location or the device may be defined by a user or an operator of the client device 136 via the user interface 272, as will be discussed in greater detail below. The monitoring application 212 communicates with the topology tracer application 209 to identify existing infrastructure downstream from the location in the power distribution network 100. For example, given that the predefined location comprises a transformer 115, the topology tracer application 209 is executed to identify all infrastructure downstream from the transformer 115 (e.g., subsequent transformers, smart meters 118 at residences). By identifying the downstream infrastructure, the downstream load 130 may be calculated for the transformer 115 using, at least, a summation of instantaneous and/or average powers determined for each customer 109 downstream of the transformer 115 using the meter usage data 121 sent by the smart meters 118.

To calculate the downstream load 130 for the transformer 115 at a given point in the power distribution network 100 may require, for example, determining an instantaneous power and/or average power for each customer 109 downstream from the transformer 115. The instantaneous power may be calculated to be equal to a derivative of energy with respect to time. Essentially, the instantaneous power may be calculated as the rate of change of energy with time at any point in time, as shown below in eq. 1.

$$P_{instantaneous} = \frac{dE}{dt} = \lim_{\Delta t \to 0} \frac{\Delta E}{\Delta t} \approx \frac{\Delta E}{\Delta t} = P_{average}. \qquad (eq. 1)$$

In eq. 1, the instantaneous power ($P_{instantaneous}$) may be approximated by taking a change in energy during a given period of time and dividing by the given period of time. This gives an average power ($P_{average}$) over that period of time. As may be appreciated, the shorter the period of time between readings, the closer the average is to the instantaneous power.

With readings every hour, the average power during that hour can be readily calculated by the monitoring application 212. By employing eq. 1, energy is determined in a unit of KWH. To obtain an average power in KW for a given range of time, the energy calculated in KWH may be divided by the given range of time in hours. Assuming readings are transmitted by the smart meters 118 and are obtained by the server 124 every hour, the KWH is divided by one hour. However, due to losses in the networked environment 200, readings from the smart meters 118 may not be received, for example, due to wired or wireless connectivity problems.

If a reading is missing or is inaccessible for a period of time, the monitoring application 212 may account for a difference in readings by dividing the average power by, for example, two hours and so forth, and the average power may be determined. Because the time difference is increased, a variance of the average power may increase from the instantaneous power. Yet, this strategy may be employed to account for readings not received from the smart meters 118. In another example, if the smart meters 118 are configured to transmit readings every 15 minutes, the difference in readings would be divided by 0.25 hours. In sum, the monitoring application 212 produces the average power for a single smart meter 118 for a point in time.

Once the average power for each of the downstream smart meters 118 has been determined, the loading from each smart meter 118 can be calculated and the results of the downstream infrastructure may be added. As may be appreciated, various smart meters 118 may only report in certain units of time. However, if the smart meters 118 only report in usage in a unit of KWH, then the unit of KW can be calculated. Similarly, if all of the smart meters 118 report usage in kilovolt-amp-hours (KVAH), kilovolt-amp-reactive-hours (KVARH), or as a power factor (PF), in addition to KWH, more units can be determined. For example, KVAH and KVARH can be converted to KVA and KVAR using the same methodology as KW. Given two out of the four units (KW, KVA, KVAR, and PF), the other two units can be calculated, as shown below in eq. 2:

$$VA = \sqrt{W^2 + VAR^2} = \frac{W}{PF}. \qquad (eq. 2)$$

As it is possible to calculate KW and KVAR for each customer 109, the KW and KVAR can be added. Based on the sum, the KVA and PF at that point on the network can be calculated using eq. 2. It is important to note that the total KVA is not the sum of the downstream KVAs. For example, if the customers 109 are identified by phase, then the sums are calculated on a per-phase basis to determine the downstream load 130 on each phase at any point on the power distribution network 100.

Further, the monitoring application 212 may be executed to calculate peak loading at a point on the power distribution network 100. To determine the peak loading, each hour in a time interval is calculated, providing samples of the loading at that point over a period of time. The maximum load of all those calculated is taken as the maximum load at that point on the power distribution network 100. In some situations, it is not advisable to add the maximums of the usage for each customer 109 to find a maximum loading as customers 109 generally do not all reach their individual peaks at the same time. Instead, a peak loading may be calculated as set forth below in eq. 3.

$$P_{max} = \max(\Sigma P_{customer}) \neq \Sigma \max(P_{customer}) \qquad (eq. 3).$$

As shown in eq. 3, $\Sigma \max(P_{customer})$ represents the unlikely event of all customers hitting a maximum peak at the same time. Instead, the peak loading ($P_{max}$) should be determined as $\max(\Sigma P_{customer})$. The monitoring application 212 may subsequently send the downstream load 130 as application data 285 to the client device 136, thereby permitting a user of the client device 136 to view the downstream load 130 for the predefined location in the power distribution network 100. The application data 285 may further comprise map data 288 that may be shown in association with load data 291 (comprising, for example, the downstream load 130), as will be discussed in greater detail below.

Figure 3:
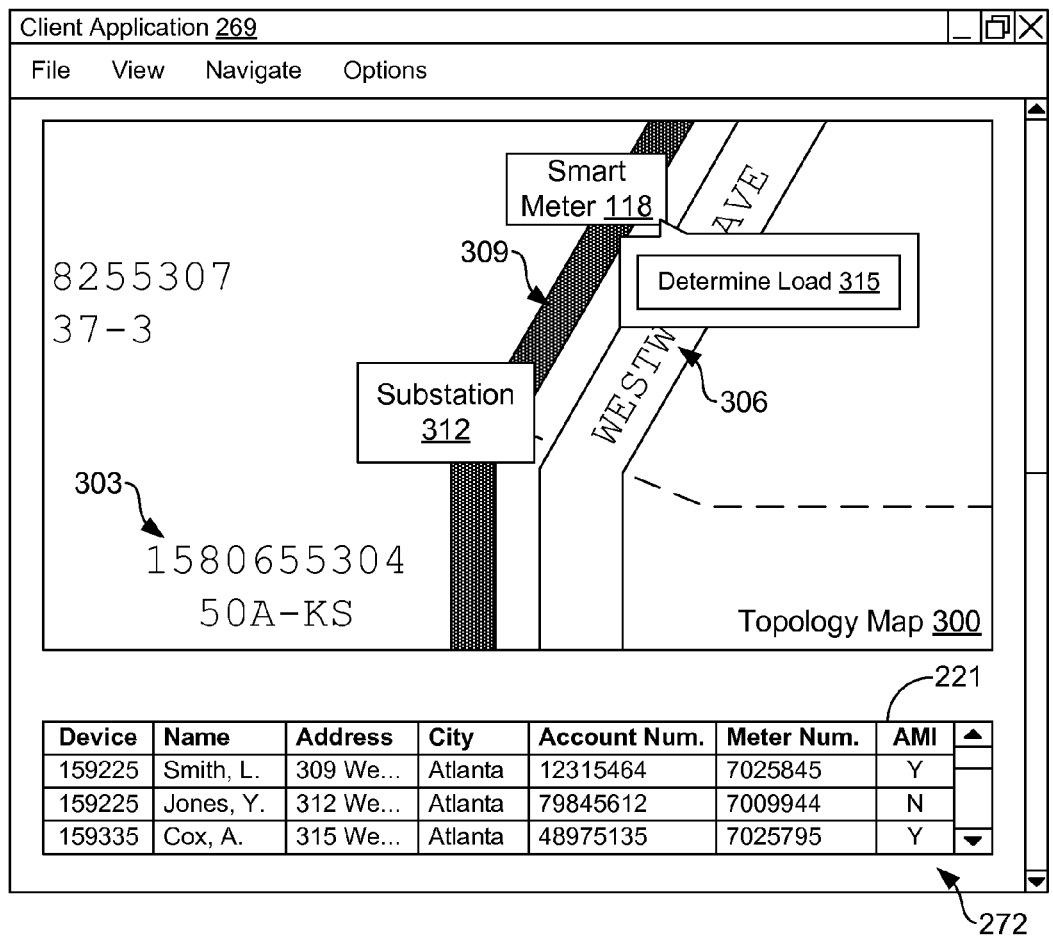
FIG. 3 is a drawing of an example user interface rendered by a client device in the networked environment of FIG. 2 according to various embodiments of the present disclosure.

Referring next to FIG. 3, shown is a drawing of a user interface 272 that may be generated in the client application 269 according to various embodiments of the present disclosure. In the non-limiting example of FIG. 3, the user interface 272 may comprise a topology map 300 representing infrastructure existing in a physical power distribution network 100. For example, the topology map 300 may comprise plat numbers 303 representing zones or locations of a city or county. Further, the topology map 300 may comprise identifiers such as roads 306, easements 309, and other identifiers. The infrastructure of the power distribution network 100 may be shown in the topology map 300. For example, a substation 312 and a smart meter 118 may represent a physical substation 312 and a physical smart meter 118 corresponding to a customer 109.

The user interface 272 may comprise customer data 221 associated with a portion of the topology map 300 shown above. To this end, the user may be able to quickly associate the smart meter 118 shown in the topology map 300 with an actual customer 109 (FIG. 1). In addition, by manipulating the determine load component 315, the user may cause the monitoring application 212 to determine the downstream load 130 (FIG. 1) for a corresponding point in the power distribution network 100. For example, the monitoring application 212 may be leveraged to determine the downstream load 130 that may be rendered in the user interface 272 subsequent to the manipulation of the determine load component 315 by the user.

Figure 4:
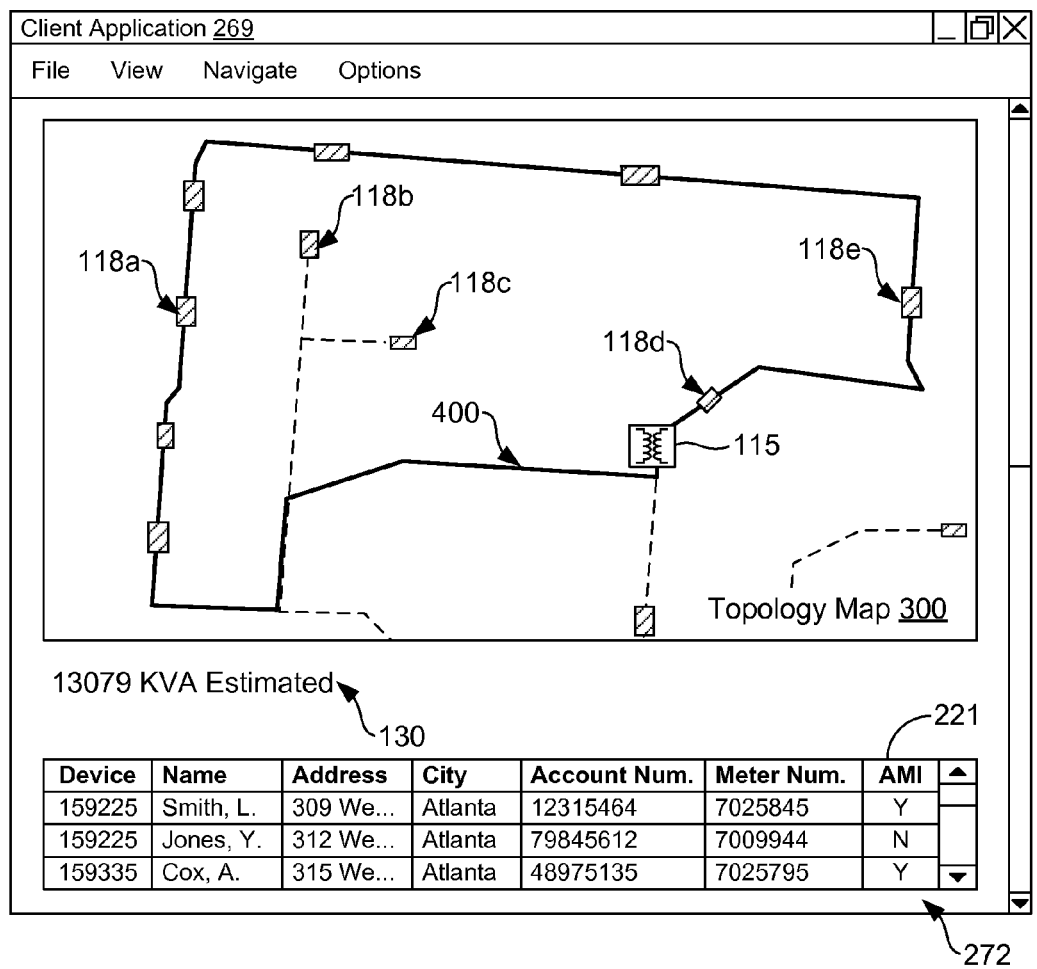
FIG. 4 is a drawing of another example user interface rendered by the client device in the networked environment of FIG. 2 according to various embodiments of the present disclosure.

Turning now to FIG. 4, shown is a drawing of a user interface 272 that may be generated in the client application 269 according to various embodiments of the present disclosure. In the non-limiting example of FIG. 4, the user interface 272 may comprise the topology map 300 (shown from a higher level) representing infrastructure existing in the physical power distribution network 100. A plurality of smart meters 118a ... 118e may be topologically traced by the user interface 272 to determine a downstream load 130 for the transformer 115. The smart meters 118a ... 118e included in a topology tracing 400 may be used to determine the downstream load 130 while those excluded in the topological tracing may be excluded from the downstream load 130.

The user interface 272 may further comprise customer data 221 associated with the smart meters 118a . . . 118e included in the topology tracing 400. To this end, the user may be able to quickly associate the smart meters 118a . . . 118e shown in the topology map 300 with an actual customer 109 (FIG. 1). The monitoring application 212 may be leveraged to determine the downstream load 130 rendered in the user interface 272.

Figure 5:
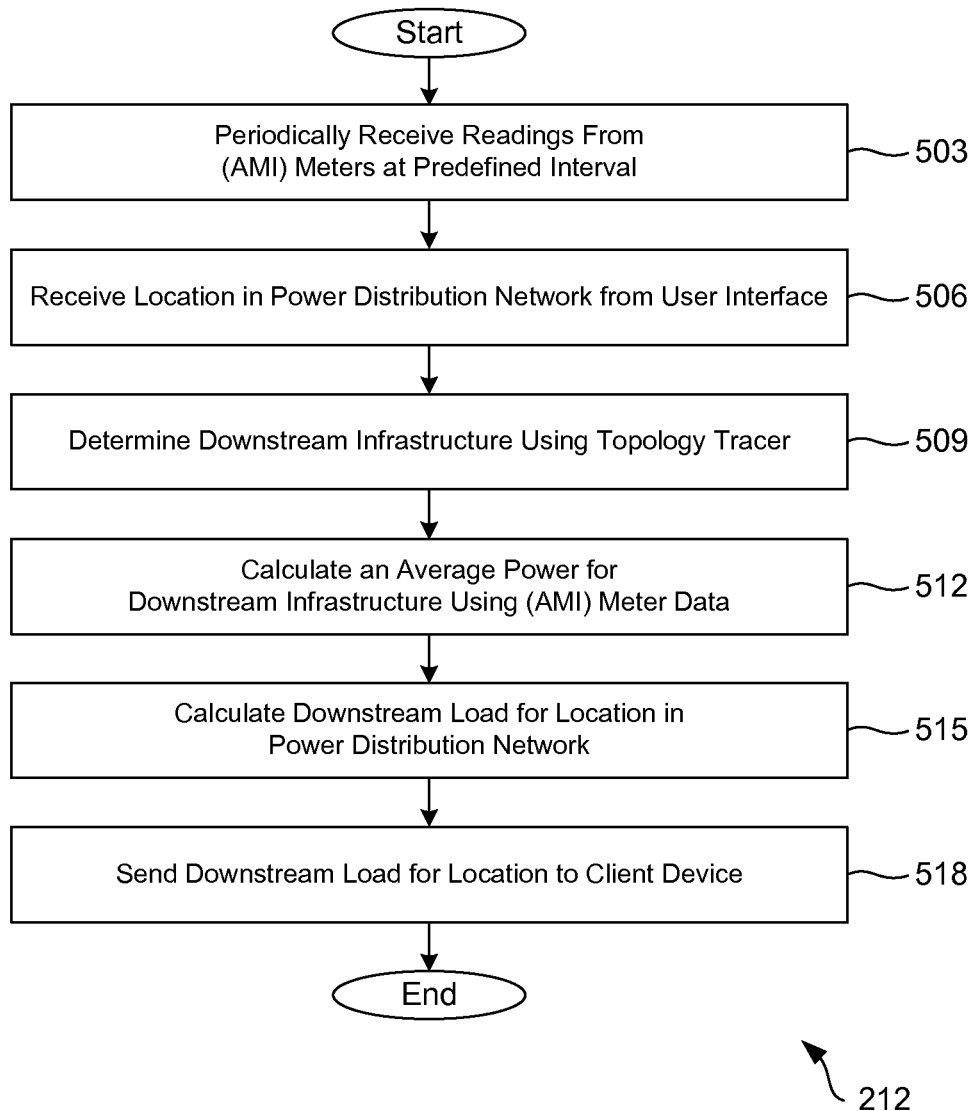
FIG. 5 is a flowchart illustrating one example of functionality implemented as portions of a monitoring application executed in a server in the networked environment of FIG. 2 according to various embodiments of the present disclosure.

Referring next to FIG. 5, shown is a flowchart that provides one example of the operation of a portion of the monitoring application 212 according to various embodiments. It is understood that the flowchart of FIG. 5 provides merely an example of the many different types of functional arrangements that may be employed to implement the operation of the portion of the monitoring application 212 as described herein. As an alternative, the flowchart of FIG. 5 may be viewed as depicting an example of elements of a method implemented in the server 124 (FIG. 1) according to one or more embodiments.

Beginning with 503, readings of power usage may be received periodically from the smart meters 118 (e.g., AMI meters). According to various embodiments, the smart meters 118 may communicate the readings as meter usage data 121 (FIG. 1) at predefined intervals (e.g., every hour, every fifteen minutes) with a timestamp 283. The readings may be stored in the data store 206 (FIG. 2) in association with a corresponding one of the smart meters 118 from which a reading is obtained. Similarly, the readings may be stored in association with a corresponding one of the customers 109.

Next, in 506, a location in the power distribution network 100 is received from, for example, the user interface 272 rendered in the client device 136. The location may comprise, for example, a location of a device in the power distribution network 100 (e.g., a transformer). As discussed above, the monitoring application 212 uses the meter usage data 121 to determine a downstream load 130 for a location or device in the power distribution network 100.

In 509, the monitoring application 212 communicates with the topology tracer application 209 to identify existing infrastructure downstream from the location in the power distribution network 100. For example, given that the location received in 506 comprises a transformer 115 (FIG. 1), the topology tracer application 209 is executed to identify all infrastructure downstream from the transformer 115 (e.g., subsequent transformers, smart meters at residences). By identifying the downstream infrastructure, a load may be determined for the transformer 115 using, at least, a summation of average power for each device in the downstream infrastructure.

As a non-limiting example, to accurately calculate the downstream load 130 for a transformer 115 at a given point in a power distribution network 100 may require, for example, determining the average power for each customer 109 downstream from transformer 115. Accordingly, in 512, an average power is determined for each device in the downstream infrastructure. The average power may be determined for a customer 109 utilizing the readings obtained from the smart meter 118 of the customer 109.

According to various embodiments, the customers 109 may be identified in association with a corresponding one of the smart meters 118 using customer data 221. Once the smart meters 118 have been identified, the average power for each smart meter 118 can be calculated and the results of the downstream infrastructure may be added. According to various embodiments, the summation may be conducted on a per-phase basis to calculate a loading on each phase at any point in the power distribution network 100.

Subsequently, in 518, the downstream load 130 may be sent by the monitoring application 212 to the client device 136 as application data 285, thereby permitting a user of the client device 136 to view the downstream load 130 for the predefined location in the power distribution network 100. The application data 285 may further comprise map data 288 that may be shown in association with load data 291, as shown in the user interfaces 272 of FIGS. 3-4.

According to various embodiments, the monitoring application 212 may comprise an application implemented in a supervisory control and data acquisition (SCADA) system. In alternative embodiments, the monitoring application 212 may be implemented in non-SCADA systems. As may be appreciated, a load on a fuse or the transformer 115 is unable to be calculated using a SCADA system, because the fuse and the transformer are generally not SCADA-compliant devices. The monitoring application 212 may continue to calculate the load on any device or line segment because it does not rely on sensors or meters located at the fuse or the transformer 115, instead relying on a calculation using measurements obtained from a smart meter 118 at the business or residence of the customer 109.

Further, the solutions described herein may work from the opposite side of the power distribution network 100. For example, instead of working from the substation out to the customer 109, calculations are made from the customer 109 back upstream to a point on the power distribution network 100, thereby accounting for actual loads measured for each customer 109 downstream. Calculating a load at a point on the power distribution network 100 has extremely broad implications. For example, sizing transformers is based on estimated guessing. A monthly bill of a customer 109 was multiplied by a statistical factor to try to determine a peak load of the customer 109. By accurately measuring an actual peak, sizing transformers 115 may be achieved more accurately.

The load on the power distribution network 100 is also important in switching. When moving a load from one distribution line 133 (FIG. 1) to another, it is important to know the load of both lines so that when moving load, a distribution line 133 does not get overloaded. Thus, an accurate load calculation prevents creating additional problems, and improves reliability. In addition, when designing the power distribution network 100, it is important in system planning to know loads so that the right size equipment can be installed to handle that load.

Thus, according to various embodiments, a system may comprise a plurality of AMI meters in data communication with a monitoring computing device over a power distribution network 100 and a monitoring application 212 executed in the monitoring computing device. The monitoring application, when executed, causes the monitoring computing device to periodically receive a plurality of readings at a predefined interval from a respective one of the AMI meters, the respective one of the AMI meters corresponding to a predefined location in the power distribution network 100, determining an average power for the predefined location utilizing the readings received from the respective one of the AMI meters, and calculating a downstream load for the power distribution network 100 at the predefined location in the power distribution network 100.

Figure 6:
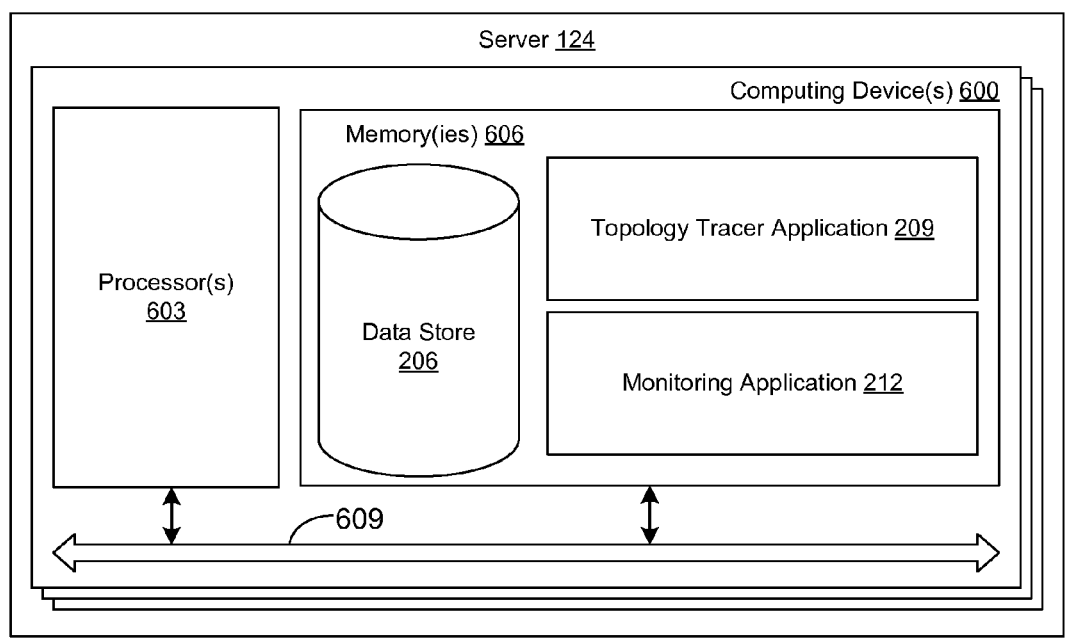
FIG. 6 is a schematic block diagram that provides one example illustration of the server employed in the networked environment of FIG. 2 according to various embodiments of the present disclosure.

With reference to FIG. 6, shown is a schematic block diagram of the server 124 according to an embodiment of the present disclosure. The server may include one or more computing devices 600, wherein each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the topology tracer application 209, the monitoring application 212, and potentially other applications. Also stored in the memory 606 may be a data store 206 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the topology tracer application 209, the monitoring application 212, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the monitoring application 212. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the topology tracer application 209 and the monitoring application 212, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the topology tracer application 209 and the monitoring application 212, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a plurality of Advanced Metering Infrastructure (AMI) meters capable of data communication with a monitoring computing device over a power distribution network; and
a monitoring application executed in the monitoring computing device, wherein, when executed, the monitoring application causes the monitoring computing device to at least:
identify downstream infrastructure from a predefined location in the power distribution network, the downstream infrastructure comprising a subset of the plurality of AMI meters, wherein the predefined location in the power distribution network is defined from user input;
receive a plurality of readings at a predefined interval from the subset of the AMI meters, each of the AMI meters corresponding to a customer of a utility company, the subset of the AMI meters being downstream from the predefined location in the power distribution network, and the AMI meters being configured to transmit consumed power in the plurality of readings;
determine an average power for the customer utilizing the readings received from the AMI meters;
calculate a downstream load for the downstream infrastructure associated with the predefined location in the power distribution network utilizing the average power; and
send the downstream load to a client device for rendering in a display via a user interface.

2. The system of claim 1, wherein the user interface further comprises a topology map showing the subset of the AMI meters downstream from the predefined location.

3. The system of claim 2, wherein the downstream load is shown in the user interface in association with the topology map.

4. The system of claim 1, wherein the user input of the predefined location is obtained by the user interface.

5. The system of claim 1, wherein the average power is determined as a function of a change in energy and a change of time.

6. A method, comprising:
identifying, by a computing device, downstream infrastructure from a device in a power distribution network, the downstream infrastructure comprising at least one of a plurality of smart meters;
receiving, by the computing device, a plurality of readings from the at least one of the plurality of smart meters, the at least one of the smart meters being downstream from the device in the power distribution network, the at least one of the smart meters being configured to transmit power consumed by a customer in the readings;
determining, by the computing device, an average power utilizing the readings received from the at least one of the smart meters; and
calculating, by the computing device, a downstream load for the downstream infrastructure associated with the device in the power distribution network utilizing the average power.

7. The method of claim 6, wherein the smart meters further comprise a plurality of Advanced Metering Infrastructure (AMI) meters.

8. The method of claim 6, wherein the device further comprises a transformer in the power distribution network.

9. The method of claim 6, wherein the readings are received by the computing device periodically at a predefined interval.

10. The method of claim 9, wherein the average power accounts for a missed one of the readings not received at the predefined interval.

11. The method of claim 6, further comprising sending, by the computing device, the downstream load to a client device for rendering in a display via a user interface.

12. The method of claim 6, wherein the average power is determined as a function of a change in energy and a change of time.

13. The method of claim 6, wherein the device is obtained as user input from a user interface.

14. A power distribution network, comprising:

a plurality of smart meters capable of data communication with at least one access point in the power distribution network; and a monitoring computing device executing a monitoring application, wherein, when executed, the monitoring application causes the monitoring computing device to at least:

identify downstream infrastructure from a predefined location in the power distribution network, the downstream infrastructure comprising a subset of the plurality of smart meters;

receive a plurality of readings from the subset of the smart meters, the subset of the smart meters being downstream from the predefined location in the power distribution network, the subset of the smart meters being configured to transmit power consumed by a customer in the readings;

determine an average power utilizing the readings received from the subset of the smart meters; and calculate a downstream load for the downstream infrastructure associated with the predefined location in the power distribution network utilizing the average power.

15. The power distribution network of claim 14, wherein the smart meters further comprise a plurality of Advanced Metering Infrastructure (AMI) meters.

16. The power distribution network of claim 14, wherein the predefined location corresponds to a transformer in the power distribution network.

17. The power distribution network of claim 14, wherein the readings are received by the monitoring computing device periodically at a predefined interval.

18. The power distribution network of claim 17, wherein the average power accounts for a missed one of the readings not received at the predefined interval.

19. The power distribution network of claim 14, wherein the monitoring application further causes the monitoring computing device to send the downstream load to a client device for rendering in a display via a user interface.

20. The power distribution network of claim 14, wherein the average power is determined as a function of a change in energy and a change of time.

* * * * *